(12) United States Patent
Matchett et al.

(10) Patent No.: US 7,092,525 B2
(45) Date of Patent: Aug. 15, 2006

(54) CRYPTOGRAPHIC SYSTEM WITH ENHANCED ENCRYPTION FUNCTION AND CIPHER KEY FOR DATA ENCRYPTION STANDARD

(76) Inventors: Noel D. Matchett, 1001 Spring St., Suite 123, Silver Spring, MD (US) 20910; John E. Hershey, 4 Vines Rd., Ballston Lake, NY (US) 12019

( * ) Notice: Subject to any disclaimer, the term of this patent is extended or adjusted under 35 U.S.C. 154(b) by 879 days.

(21) Appl. No.: 09/838,123

(22) Filed: Apr. 20, 2001

(65) Prior Publication Data

US 2002/0051534 A1 May 2, 2002

Related U.S. Application Data

(60) Provisional application No. 60/198,575, filed on Apr. 20, 2000.

(51) Int. Cl.
*H04K 1/00* (2006.01)
*H04L 9/00* (2006.01)

(52) U.S. Cl. .............................. 380/29; 380/28; 380/37; 380/42; 380/259

(58) Field of Classification Search ................. 380/29, 380/42, 37
See application file for complete search history.

(56) References Cited

U.S. PATENT DOCUMENTS

| | | | | | |
|---|---|---|---|---|---|
| 3,798,359 | A | | 3/1974 | Feistel | 178/22 |
| 3,798,360 | A | * | 3/1974 | Feistel | 380/37 |
| 3,958,081 | A | | 5/1976 | Ehrsam et al. | 178/22 |
| 4,319,079 | A | * | 3/1982 | Best | 713/190 |
| 5,003,596 | A | * | 3/1991 | Wood | 380/28 |
| 5,003,597 | A | * | 3/1991 | Merkle | 380/37 |
| 5,008,935 | A | * | 4/1991 | Roberts | 380/29 |
| 5,623,549 | A | * | 4/1997 | Ritter | 380/37 |
| 5,687,237 | A | * | 11/1997 | Naclerio | 380/29 |
| 5,745,577 | A | * | 4/1998 | Leech | 380/28 |
| 6,272,221 | B1 | * | 8/2001 | Tsunoo | 380/28 |
| 6,952,478 | B1 | * | 10/2005 | Lee et al. | 380/37 |

OTHER PUBLICATIONS

Michael Portz, On the use of Interconnection Network in Cryptograph, 1991, Advanced in Cryptography-EUROCRYPT'91, @Springer-Verlag Heidlberg 1991; retrieved data Feb. 2, 2005 http://springerlink.metapress.com/media/G2E72BWGVQCTRP64QWTM/Contributions/F/Q/H/C/F.*

K. Wong, A Single-Chip FPGA Implementation of the Data Encryption Standard (DES) Algorithm, 1998, IEEE, retrieved data Feb. 2, 2005.*

* cited by examiner

*Primary Examiner*—Kambiz Zand
*Assistant Examiner*—Samson Lemma
(74) *Attorney, Agent, or Firm*—Westerman, Hattori, Daniels & Adrian, LLP.

(57) ABSTRACT

An enhanced cryptographic system of high security for a ciphering of a block of data bits under control of a cryptographic key and for generating a one way transformation of a block of data bits with said cryptographic system being based upon the traditional DES but utilizing a variable permutation after the S box substitution function. Said variable permutation is able to be realized in an FPGA implementing the variable permutation via a switching network such as an Omega or Bennes-Waksman network with the switching network control elements under control of the cryptographic key and with an electable mode compatible with the traditional single DES and TDEA and their various modes and with a further capability for a privacy mode within a set of holders of common cryptographic key via a sub key selection mask. A method and process for efficient interruption and resumption of the cryptographic operation are also described.

17 Claims, 8 Drawing Sheets

CRYPTOGRAPHIC SYSTEM WITH ENHANCED ENCRYPTION FUNCTION AND CIPHER KEY FOR DATA ENCRYPTION STANDARD

Priority is hereby claimed for the Applicants Provisional U.S. Ser. No.: 60/198,575 filed on Apr. 20, 2000.

BACKGROUND OF THE INVENTION

1. Field of the Invention

The present invention is generally directed to data encryption or cryptography, and more specifically, to an improved Data Encryption Standard (DES) cryptographic system for cryptographic protection of data through modifications to the cipher function and cipher key as specified in the DES.

2. Description of the Related Art

The introduction of a high grade cryptographic system to the public domain marked the commencement of serious widespread public research in the field of cryptography. The DES as promulgated by the U.S. government in FIPS PUB 46 on Jan. 15, 1977 is perhaps the most widely analyzed cryptographic system in history and has stood well against many and varied attacks. The DES has been widely employed and has served as a model for development of many other cryptographic algorithms. U.S. Pat. No. 3,962,539 issued on Jun. 8, 1976 to Ehrsam, et al. describes the basic DES device and process and is incorporated herein in its entirety by this cross reference.

The traditional DES is a block cipher, which acts on independent fixed-length, plaintext input blocks and yields fixed-length output blocks. That is, the DES encryption process maps 64-bit plaintext input blocks into 64-bit ciphertext output blocks. There are $2^{56}$ (i.e. $10^{16.8}$) mappings where each mapping selected by a 56-bit keying variable is unique and invertible. The DES decryption is a reverse of the encryption mapping, and requires knowledge of the specific keying variable used in the encryption process.

The use of the DES as a cryptographic system is built around its most basic mode, which is known as the Electronic Code Book (ECB) mode. Other modes of DES, such as Cipher Block Chaining (CBC), Cipher Feedback (CFB) and Output Feedback (OFB), are described in the Federal Information Processing Standards Publication (FIPS PUB) number 81. In the ECB mode, a 64-bit plaintext word is converted to a 64-bit ciphertext word. This conversion is a one-to one and reverse mapping is electable. This conversion is also done under the control of a 56-bit keying variable. The keying variable for the DES is generally given as 64-bits with the convention of using 8 bits as the odd parity bits.

Alternative Modes of Using the DES from FIPS PUB 81, DES Modes of Operation are the Cipher Block Chaining (CBC) mode, the Cipher Feedback (CFB) mode, and the Output Feedback (OFB) mode. ECB is a direct application of the DES algorithm to encrypt and decrypt data; CBC is an enhanced mode of ECB which chains together blocks of cipher text; CFB uses previously generated cipher text as input to the DES to generate pseudorandom outputs which are combined with the plaintext to produce cipher, thereby chaining together the resulting cipher; OFB is identical to CFB except that the previous output of the DES is used as input in OFB while the previous cipher is used as input in CFB. OFB does not chain the cipher.

With the inexorable advance in available worldwide computer power coupled with the existing fame of the DES algorithm, it was inevitable that the DES algorithm would continue to draw attention and challenges as to its sufficiency in protecting data at the highest level. In particular, challenges have been mounted through parallel exhaustive attack and so-called special attacks in which one seeks to find a path to a solution that is computationally less than that of simple exhaustion.

There are two important publications with respect to cryptanalysis of the DES cryptoprinciple. The publications represent two very powerful distinct cryptanalytic approaches. Neither approach was initially successful at defeating the DES but both approaches deserve consideration as genres of potent cryptanalysis. The first of these was reported in the paper "Exhaustive Cryptanalysis of the NBS Data Encryption Standard" by W. Diffie and M. Hellman (Computer June 12977, pp. 74–84). This paper discussed the construction of a large parallel processor in which the entire 56-bit keying variable space was partitioned over a very large number of identical independent processors. The paper also advanced the argument that declining computation costs would eventually reduce the cost of a solution to a nominal sum.

This type of attack can be countered, of course, by increasing the size of the keying variable and it would not require a variable of much larger size than the 56-bit variable to effectively frustrate this approach.

The second attack is detailed in a lengthy paper entitled "Differential Cryptanalysis of DES-like Cryptosystem" by E. Biham and A. Shamir (The Weizmann Institute of Science/Department of Applied Mathematics, Jun. 18, 1990). This paper is a seminal work in academic cryptography. It introduces a new statistical cryptanalytic method termed Differential Cryptanalysis that the authors described as "a method which analyses the effect of particular differences in plaintext pairs on the differences of the resultant ciphertext pairs." These differences can be used to assign probabilities to the possible keys and to locate the most probable key.

Biham and Shamir use the DES as an example for their new cryptanalytic method. They characterize the DES as an iterated crypto system in that it realizes a strong cryptographic function by iterating a weaker function many times. Their attack is based on Boolean differencing in which the structure of the DES appears to be an ideal candidate for this type of cryptanalysis.

When applied to the DES, their attack would have beaten exhaustion if the DES had used less than 16 rounds of iteration. In particular, the following points were observed:

(1) modification of the key scheduling algorithm cannot make the DES much stronger;
(2) the attacks on DES with 9–16 rounds are not influenced by the P permutation and the replacement of the P permutation by any other fixed permutation or function cannot make them less successful;
(3) replacement of the order of the S-boxes without changing their values can make the DES weaker;
(4) replacement of the XOR operation by the more complex addition operation makes the DES much weaker; and
(5) the DES with randomly chosen S-boxes is very easy to break. Even a change of one entry in one S-box can make the DES easier to break.

The initial differentiation cryptanalytic technique was shown successful against a DES with fewer than 16 rounds because the statistical characteristics of the Boolean function combining can be easily discovered and tests built around these statistics.

Further work related to differential cryptanalysis encompasses so called linear cryptanalysis ("Linear Cryptanalysis Method for DES Cipher," Mistura Matsui, Abstracts of EUROCRYPT'93, pp. W112–123) and statistical attacks by Davis and others. Biham and Shamir published an improvement of one of these attacks in "An Improvement of Davies' Attack on DES," EUROCRYPT '94, pp. 461–467. In this paper they reported breaking the full 16-round DES faster than exhaustive search. The statistical attack requires a larger volume of known plaintext-ciphertext pairs.

What the various cryptographic attacks and the increase in computer power available to exhaust (i.e. try all possible ) the 56 bit key of single DES have done is cause the U.S. Government to recommend using TDEA or Triple DES. TDEA basically uses the 16 rounds of the single DES engine three times with different cryptographic keys to provide increased security. The penalty that is paid for the TDEA is a three fold increase in running time over the single DES.

As noted in FIPS PUB 46-3 Oct. 25, 1999: "With regard to the use of single DES, exhaustion of the DES (i.e. breaking a DES encrypted ciphertext by trying all possible keys) has become increasingly more feasible with technology advances. Following a recent hardware based DES key exhaustion attack, NIST can no longer support the use of single DES for many applications. Therefore, Government agencies with legacy systems are encouraged to transition to Triple DES. Agencies are advised to implement Triple DES when building new systems."

Also from FIPS PUB 46-3: "DES forms the basis for TDEA (Triple Data Encryption Algorithm or Triple DES)." "The X9.52 standard, "Triple Data Encryption Algorithm Modes of Operation" describes seven different modes for using TDEA (Triple Data Encryption Algorithm or Triple DES) described in this standard. These seven modes are called the TDEA Electronic Codebook Mode of Operation (TECB) mode, the TDEA Cipher Block Chaining Mode of Operation (TCBC), the TDEA Cipher Block Chaining Mode of Operation—Interleaved (TCBC-I), the TDEA Cipher Feedback Mode of Operation (TCFB), the TDEA Cipher Feedback Mode of Operation—Pipelined (TCFB-P), the TDEA Output Feedback Mode of Operation (TOFB), and the TDEA Output Feedback Mode of Operation—Interleaved (TOFB-I). The TECB, TCBC, TCFB and TOFB modes are based upon the ECB, CBC, CFB and OFB modes respectively obtained by substituting the DES encryption/decryption operation with the TDEA encryption/decryption operation.

A DES key consists of 64 binary digits ("0"s or "1"s) of which 56 bits are randomly generated and used directly by the algorithm. The other 8 bits, which are not used by the algorithm, may be used for error detection. The 8 error detection bits are set to make the parity of each 8-bit byte of the key odd, i.e., there is an odd number of "1"s in each 8-bit byte. A TDEA key consists of three DES keys, which is also referred to as a key bundle. Authorized users of encrypted computer data must have the key that was used to encipher the data in order to decrypt it. The encryption algorithms specified in this standard (i.e. FIPS 46-3) are commonly known among those using the standard.

This standard became effective July 1977. It was reaffirmed in 1983, 1988, 1993, and 1999. It applies to all Federal agencies, contractors of Federal agencies, or other organizations that process information (using a computer or telecommunications system) on behalf of the Federal Government to accomplish a Federal function. Each Federal agency or department may issue internal directives for the use of this standard by their operating units based on their data security requirement determinations.

With this modification of the FIPS 46-2 standard (i.e. FIPS 46-3):
1. Triple DES (i.e., TDEA), as specified in ANSI X9.52 will be recognized as a FIPS approved algorithm.
2. Triple DES will be the FIPS approved symmetric encryption algorithm of choice.
3. Single DES (i.e DES) will be permitted for legacy systems only. New procurements to support legacy systems should, where feasible, use Triple DES products running in the single DES configuration.

SUMMARY OF THE INVENTION

The present invention has been accomplished in view of the above circumstances, and it is an object of the present invention to provide an enhanced DES cryptographic system having an enhanced DES device and process to strengthen the cryptanalytic resistive structure of the DES.

It is another object of the present invention to provided an enhanced DES cryptographic system which may be made compatible with existing DES fielded systems and circuits.

It is still another object of the present invention to provide an enhanced DES cryptographic system which can operate at high speed without high electronic or software complexity or cost.

To achieve the above objects, applicants' enhanced DES cryptographic device, system, and process of the present invention improves on the traditional DES by allowing for multiple levels of increased security and longer key lengths while retaining fundamental elements of the traditional DES. This increased security is likely stronger that TDEA or Triple DES yet because it uses a structure similar to the single DES structure it runs in the time and at speeds of single DES and hence avoids the three fold run time penalty of TDEA.

The enhanced DES cryptographic system of the present invention uses modifications to improve on the conventional DES which allows for increased levels of security for each of the four single DES modes (i.e., ECB, CBC, CFB and OFB) while incorporating a form that may be made compatible with the traditional 56 bit DES/DEA algorithm. DEA (Data Encryption Algorithm) is the term used by ANSI and the international community to identify DES. Similarly the enhanced DES cryptographic system and process of the present invention can improve on the TDEA by allowing for increased levels of security for each of the seven modes using the enhanced DES system as a basis while incorporating forms that are compatible with the traditional seven TDEA modes called the TDEA Electronic Codebook Mode of Operation (TECB) mode, the TDEA Cipher Block Chaining Mode of Operation (TCBC), the TDEA Cipher Block Chaining Mode of Operation—Interleaved (TCBC-I), the TDEA Cipher Feedback Mode of Operation (TCFB), the TDEA Cipher Feedback Mode of Operation—Pipelined (TCFB-P), the TDEA Output Feedback Mode of Operation (TOFB), and the TDEA Output Feedback Mode of Operation—Interleaved (TOFB-I). The enhanced algorithm modifies the fixed permutation P of the classic DES algorithm that is applied after the S boxes while preserving its character of a 1—1 mapping. One of the preferred embodiments utilizes a logical array of binary switches in a structured class of networks (e.g. Omega networks or Benes-Waksman networks) so as to construct permutations which can vary. Depending upon the particular network implemented, a related fixed permutation may be computed so that when the binary switches are all set to a default condition, the resulting permutation created by the network when followed by the related fixed permutation, results in a permutation equivalent to the fixed permutation of the conventional DES. This is a means used to create the feature of "backward compatibility" with the traditional single DES or the traditional modes of TDEA. These variable permutations can be based upon elements of the cryptographic key (i.e. cryptovariable), or can depend on additional elements such as an encipherment counter or frame counter or some permanently fixed bits. Although there are many logically equivalent ways to implement the variable permutation which are all compatible as long as the logical structure is maintained, the enhancement of the present invention is such that as long as the permutation is kept secret and not known by unauthorized parties, the permutation could be varied less frequently than the life of the 56 bit cryptographic key for the single DES, or it can be changed at the beginning of a cryptoperiod and not changed until the next cryptoperiod or it could be varied within the cryptoperiod based upon such factors or various combinations of the following such factors as additional bits from a cryptographic key, a clock or counter, specified number of output bits from the encryption engine after every set of 16 rounds of the engine, or within engine's operating cycle at each separate "round" of the engine. Of course, these additional elements must also be known by the "decrypt" engine.

It is well known to persons skilled in the art that various cryptographic devices can be used to generate bit streams and vectors for other cryptographic purposes than message encryption and decryption such as symmetric keys for other cryptographic devices or initialization vectors. Some schemes use randomizers or noise diodes which produce non deterministic outputs that can be used for cryptographic keys and or starting settings or initialization vectors for cryptographic devices. In these types of applications it is not necessary nor is it desirable to communicate the initial settings, cipher keys and randomizer bits of the cipher machine used as this type of bit stream generator to any other cipher machine. In the applicants' enhanced device a preferred method of utilizing such randomizer output bits is in the generation of the P* permutation where the randomizer bits are used directly or indirectly (e.g. setting a maximal length LFSR) for beta elements in an Omega network and to also be used in determining when to replace the P* permutation with another P*. One of the traditional concerns has been that a biased (i.e. not exactly 50% ones and 50% zeros) randomizer when used for the initialization of a cipher device may cause biased or partially predictable outputs. The same concern occurs when the randomizer is used to directly produce cryptographic keys used by a cryptographic device to generate so called random output. Using the non-deterministic output of a randomizer to generate and or replace the P* permutation provides additional assurance against any such biased or partially predictable output from the enhanced device of the present invention.

Related aspects and advantages of the invention will become apparent and more readily appreciated from the following detailed description of the invention, taken in conjunction with the accompanying drawings.

DETAILED DESCRIPTION OF THE INVENTION

The present invention will now be described by way of preferred embodiments with references to the accompanying drawings. Like numerals refer to corresponding parts of various drawings.

The particular enhancements described will be to the mode known as the Electronic Codebook (ECB) mode of single DES. It is obvious to someone skilled in the art that the enhancements of the present invention also apply to the other modes and their variations and also to the various modes of TDEA.

The present invention utilizes the basic structure of DES with a modification to the fixed permutation applied after the S boxes in the f function of traditional DES. Said modification enables the permutation P* 136 applied after the S boxes 170 to be varied under control of some of the bits of the cryptographic key 134. The present invention utilizes cryptographic key bits for three purposes. The first purpose is to furnish the 56 bits (excluding the 8 bits of parity) 138 used to create the 64 bits (including the 8 bits of parity) 166 that traditional DES uses to compute the elements of the so called key schedule ($118_1 \ldots 118_{16}$). The second purpose is to supply cryptographic key bits 142 that are used to control the generation and replacement of the variable P* permutation 136. The third purpose is to provide a privacy means 150 such that encipherment of a data block 110 and decipherment of a cipher block 132 can be accomplished in private by using a secret mask 150 which determines which subset of cryptographic key bits 138 selected from the cryptographic key 134 are used for the DES key schedule 168 and which subset of the remaining cryptographic key bits 142 are used for the control and generation of the variable P* permutation 136.

Figure 8:
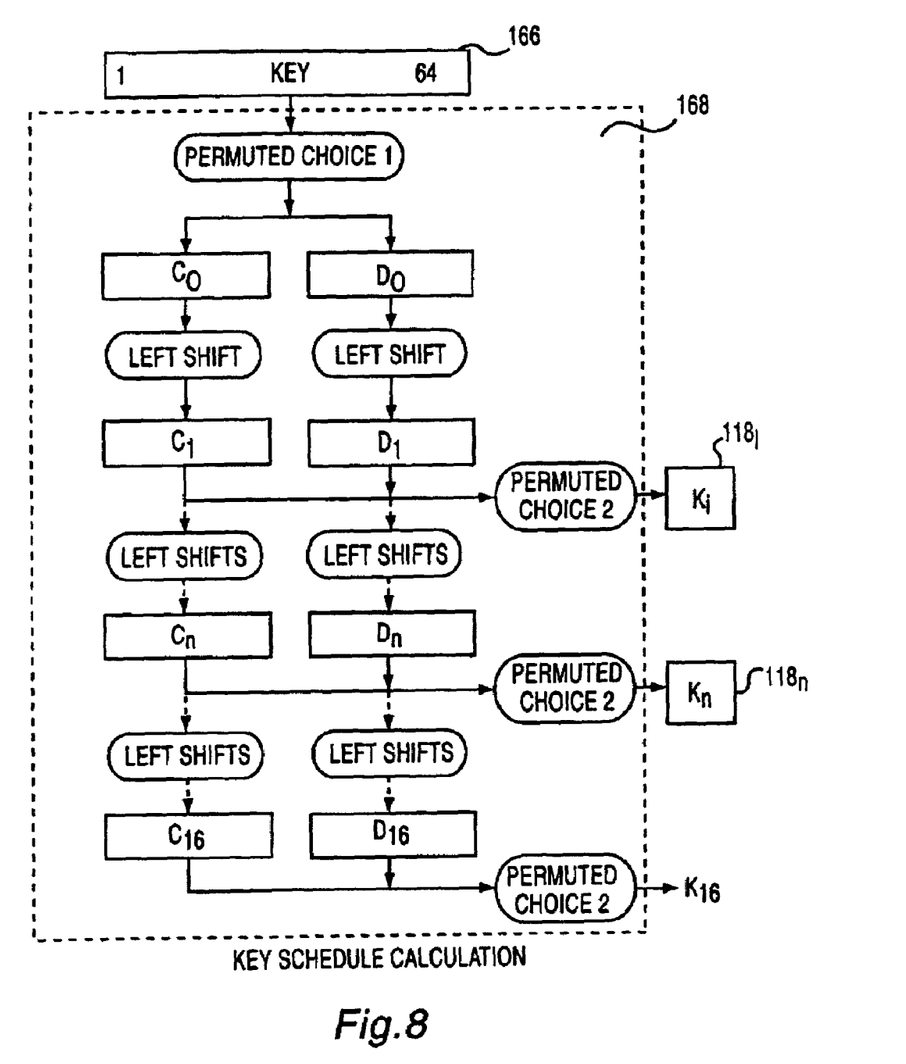
FIG. 8 is a diagram illustrating the key schedule calculations of the traditional DES.

An enhanced DES method according to the present invention is designed to encipher and decipher blocks of data consisting of, e.g., 64 bits under control of a cryptographic key. The length of the cryptographic key may vary but in our preferred embodiment it is at least 128 bits of which 56 bits 138 are used create a 64 bit sub key with parity 166 for the traditional DES key schedule 168 shown in FIG. 8 and the remaining 72 bits 142 used for the generation and enhancing of the P* permutation. The enhanced DES method can be implemented by various electronic devices, which are designed in such a way that they can be used in a computer system or network to provide cryptographic protection to binary coded data.

Figure 1:
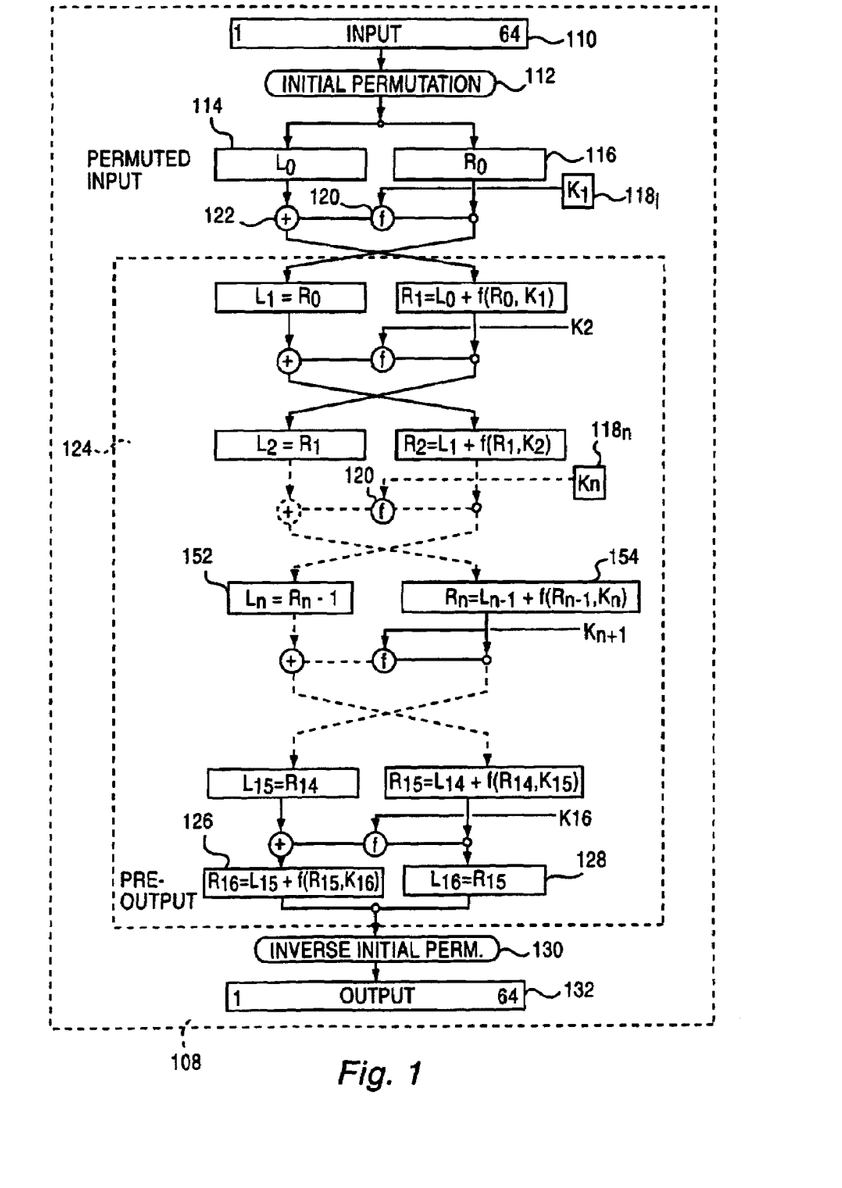
FIG. 1 is a block diagram representation of the enhanced DES system with the f function modified according to the present invention.

The steps for carrying out data encryption using the enhanced DES method according to the present invention is shown in FIG. 1. An input data block of 64 bits in step 110 is subjected to an initial permutation 112. The initial permutation in step 112 provides no cryptographic benefit but ensures compatibility with other implementations. That is, the initial permutation simply transposes bits within the input block in accordance with a table given in the conventional DES. The initially permutated data are then divided into a left half register block ($L_0$) 114 and a right half register block ($R_0$) 116 of 32-bits each. The right half register block 116 and $K_1$ $118_1$ a derivative of super keying variable ($SK_K$) 134 are used as inputs to the f function 120 whose output 176 is bit-by-bit modulo-2 added 122 with the left half register block $L_0$ 114. The $K_n$ $118_n$ in the formula below is generated according to the DES key schedule 168 shown in FIG. 8.

In particular, the output in each sub round is $L_n$ 152 and $R_n$ 154 and given by:

$$L_n = R_{n-1}$$

$$R_n = L_{n-1} \oplus f(R_{n-1}, K_n)$$

where $\oplus$ indicates the bit-by-bit modulo-2 addition

The output at the end of 16 rounds consists of a preoutput which is the concatenation of $R_{16}$ 126 and $L_{16}$ 128. Subsequently, after an inverse initial permutation in step 130, an output block of 64 bits 132 is produced.

Figure 2:
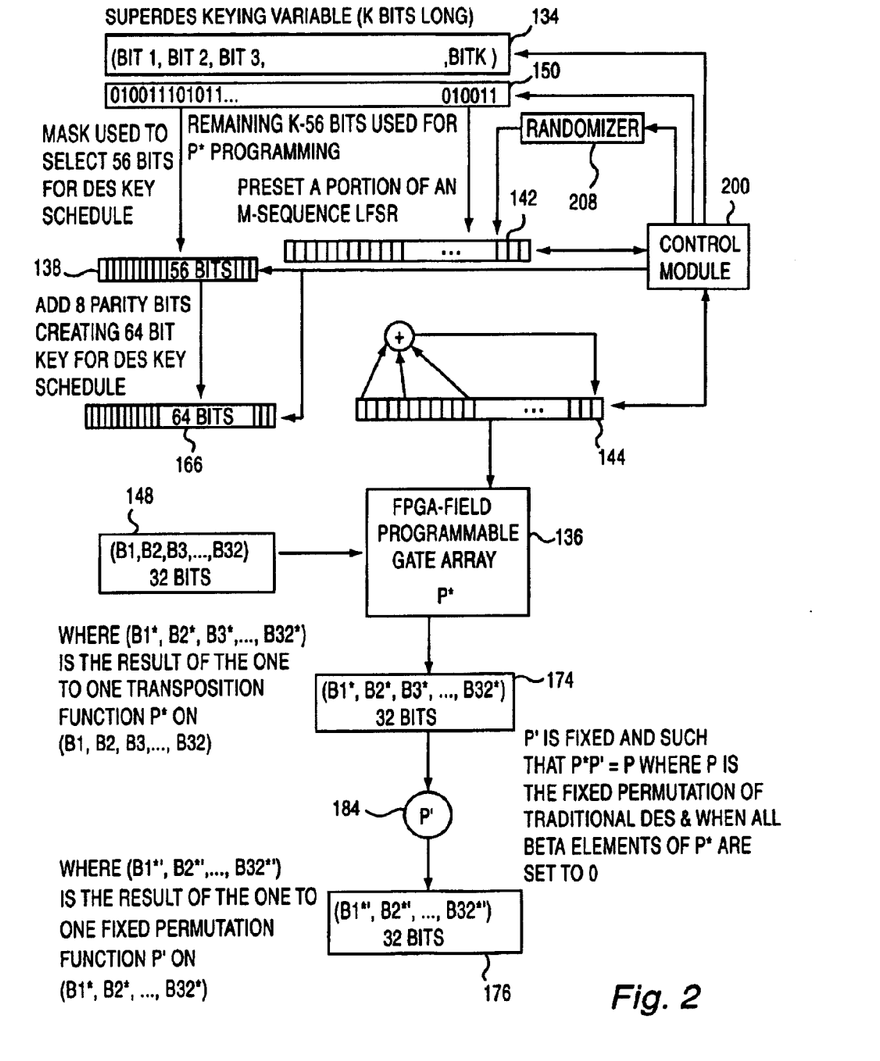
FIG. 2 is a block diagram representation of the preferred embodiment of the applicants' invention with a mask enabling key to be used for user-to-user privacy, a maximal length linear feedback shift register generating beta elements used in a switching network implemented in a FPGA which produces the varying P* permutation according to the present invention.

FIG. 2 shows an example of utilizing super keying variable (SK) 134 of K bits in length. In an example in which K=128 bits, a mask 150 selects 56 bits 138 which needs to be expanded to 64 bits with odd parity 166 for the DES key schedule 168 of FIG. 8 while the remaining K-56 bits 142 are used for P* programming. In particular, FIG. 2 shows that the remaining K-56 bits 142 are selected for programming e.g., an M-sequence linear feedback shift register (LFSR) 144 which in turn supplies, under the control of a control module 200, bits to be used as beta-elements 182 (See FIG. 4) in the Field Programmable Gate Array FPGA 136 which in turn implements the P* permutation 136. The f function 120 contains the S boxes 170 which produce a 32 bit output labeled (B1,B2, . . . ,B32) 148. These 32 bits are transposed by the P* permutation 136 resulting in a one-to-one transposition labeled (B1*,B2*, . . . ,B32*) 174.

The 32 bits 174 resulting from application of P* are further permuted by a fixed one-to-one permutation P' 184 resulting in 32 output bits 176. The P' permutation would normally be calculated at the time of designing the embodiment and is calculated so that when the beta elements of the FPGA 136 are all set to a particular default condition, which in our preferred embodiment is all zeros, the fixed P' permutation 184 is such that equivalent to the fixed and defined P permutation of the traditional DES. This is the feature that enables the present invention to have a mode that is compatible with the traditional DES. Note that the above referenced P permutation is identified in U.S. Pat. No.: 3,962,539 as 600 and its values are specified on page 15 of FIPS 46-3 as permutation function P.

The operation of the process needed to select from the SuperKey 134 the DES engine sub key 138 and the subkey 142 used to generate and or replace P* is controlled by a control module 200. This module may also be used to control bits from a randomizer 208 when the system is in the mode of generating non-reproducible and non-predictable output (i.e. unable to be decrypted or replicated by another party with the same device and settings) for use such as in generating cryptographic keys or wherever non deterministic or difficult to predict information is required.

The following is an example of an application of the privacy feature of the preferred embodiment of the present invention. Two users of an instant messaging application over the internet each have an identical implementation of the applicants' improved invention. A cipher key (e.g. 128 bits) 134 is securely supplied to each user by the messaging system. This enables the users to encrypt and decrypt messages to each other using the identical cipher key. However, depending upon the architecture and implementation of the cipher key generation and distribution system the messaging system operator may be able to hold a copy of the cipher key 134 allowing unauthorized reading of the messages sent between users. The users may wish to achieve additional privacy to protect against this unauthorized reading of messages. This can be accomplished using the present invention as follows.

First the users agree upon a secondary cipher key using an independent channel from that of the messaging service. This secondary cipher key could be another 128 bit cipher key or a mutually agreed upon pass phrase of enough length that it can be converted by a means such as ASCII representation into a binary mask 150 of 56 ones which is used to select 56 bits of sub key 138 from the original cipher key 134. The bits in the original cipher key positions corresponding to the positions of the 56 ones in the mask become the ordered 56 bits of the sub key 138. The remaining ordered 72 bits of the original cipher key are used to preset a portion of an M sequence LFSR 144 which generates bits for changing P*. The result is that the two users now have used the identical initial cipher key but each has modified it in the same unique way. This modification is as secure as the independent channel used to communicate the secondary cipher key and the means of selecting the secondary cipher key or pass phrase. If this secondary cipher key is in fact securely communicated between the two users then the users are protected against the possibility of the messaging service operator using a copy of the original cipher key in an unauthorized manner to read the messages between the two users. The situation of the messaging service operator providing pathological cipher keys such as all zeros or all ones can be checked for by the users' application.

Figure 3:
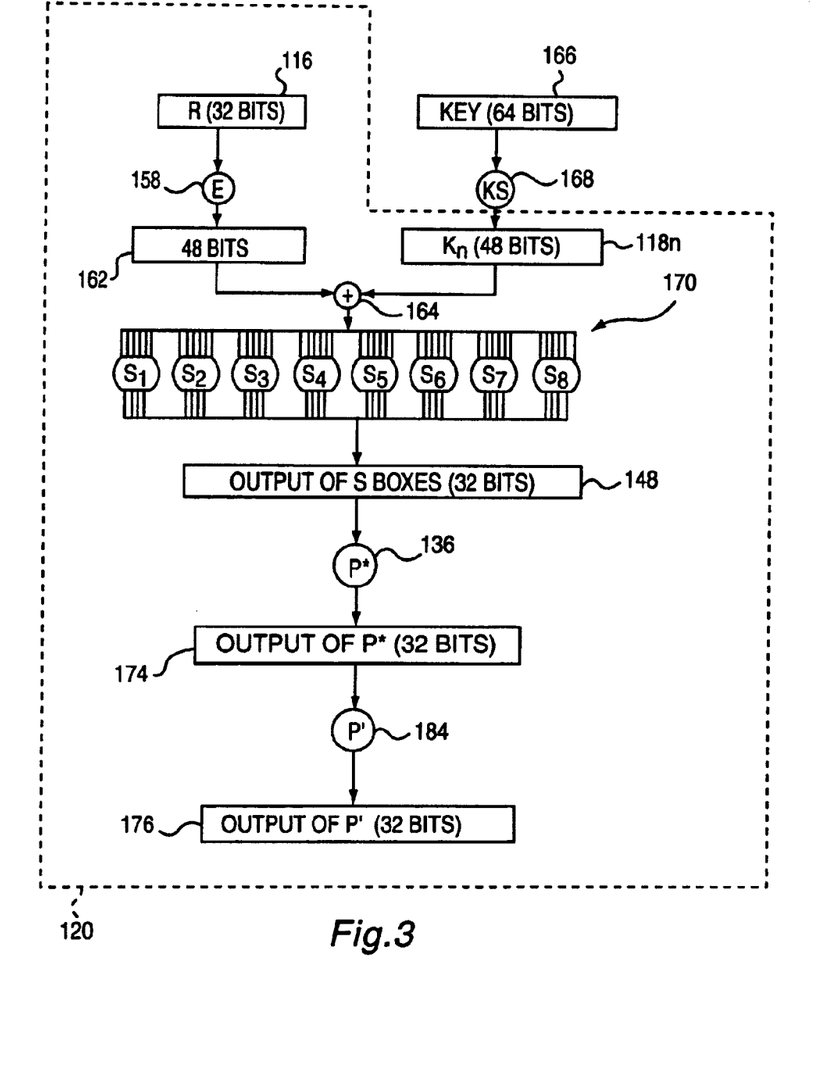
FIG. 3 is a block diagram representation of the f function according to the present invention with P* the variable permutation.

The heart of the cryptosecurity of the applicants' improved DES system resides in the f function 120 as shown in FIG. 3. As shown in FIG. 3, the register block (R) 116 is expanded by E 158 to 48 bits by repeating certain bits of the register block; This expansion is defined by a table E in the conventional DES. The 48-bit expanded register block 162 is then bit-by-bit modulo-2 added 164 with the nth element $K_n$ of the key schedule 168 which is derived from the expanded 64 bit sub key 166 which in turn is derived from the 56 bits 138 selected using the mask 150 from the super keying variable (SK) 134 of 128 bits. The result of this operation is passed to a substitution step 170. The selection step 170 is made up of eight unique substitution functions. Each of the unique substitution functions (i.e., S-boxes designated as $S_1, \ldots, S_8$) takes a 6-bit block as input and yields a 4-bit block as output. The operation of each of the eight S-boxes is defined by the conventional DES.

Figure 4:
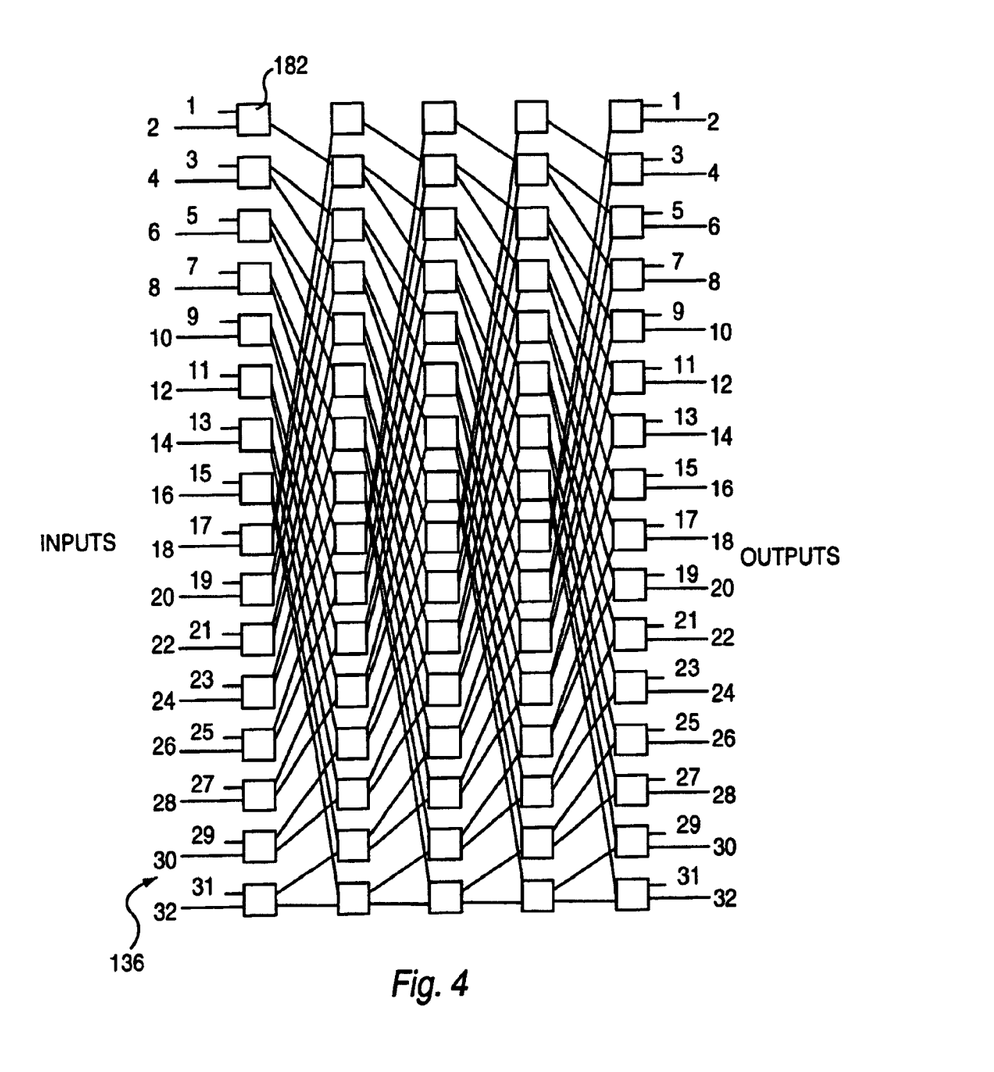
FIG. 4 is a block diagram illustrating a five-stage Omega network with 32 inputs which are grouped in 16 pairs according the present invention.
Figure 6:
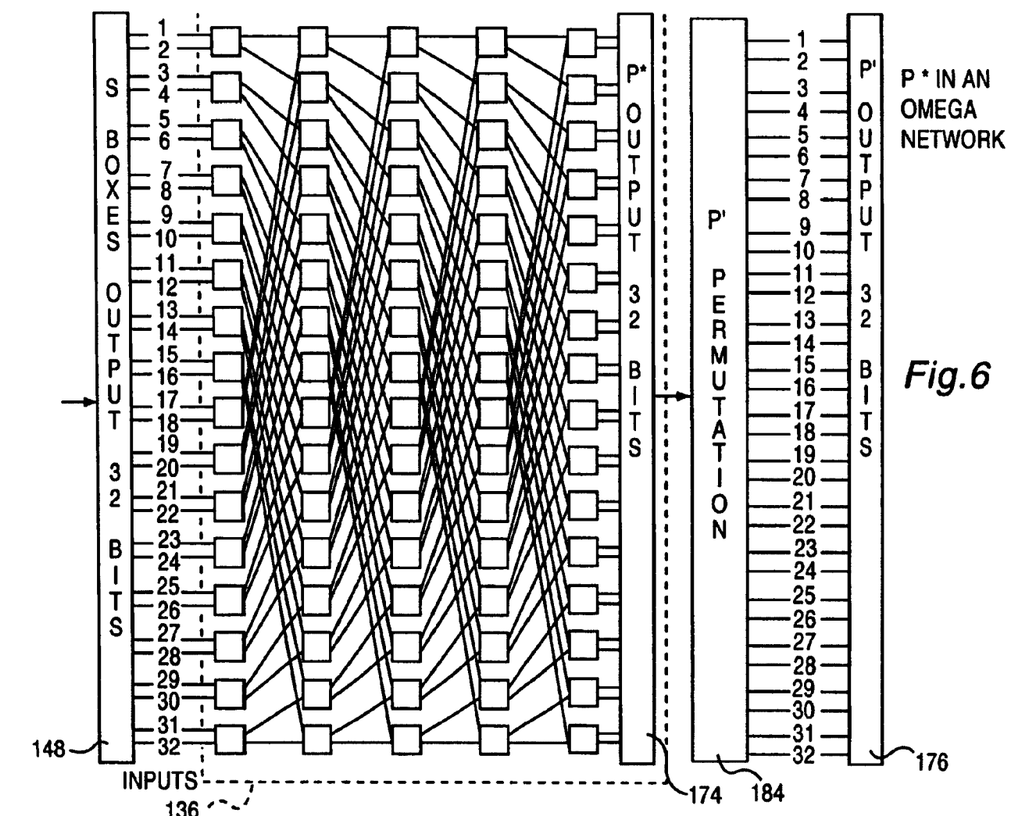
FIG. 6 is a block diagram illustrating the five-stage Omega network of FIG. 4 with a related fixed Permutation P' which when applied after the P* permutation from the Omega network with Beta elements set to a default condition, results in the P permutation of the traditional DES.

The 32 bits 148 that result from this substitution step 170 are permuted in step 136 using a dynamic permutation process (DPP) 136 as shown in FIGS. 4 and 6. This dynamic permutation process implements the P* permutation referred to earlier. The result in step 176 is f(R, K) for a particular n round.

The dynamic permutation process (DPP) 136 using a five-stage Omega Network is shown in FIG. 4. The Omega network is based on a plurality of Beta switch elements 182, each of which has two inputs and two outputs and a one bit control. Contrary to the conventional DES permutation process in which the P permutation applied after the S boxes is fixed and known, the permutation results of the DPP are dependent upon the particular Beta (*) values as set forth in each of the Beta switch elements. Some or all of the Beta values are not known because they can be supplied by the cryptographic key or cryptovariable.

The five stage Omega network as shown in FIG. 4 has 32 inputs which are grouped in 16 pairs. These inputs are fed by the 32 bit vector 148. The individual boxes are switch elements 182 with a variable Beta value. The logical wiring between switching elements as shown in FIG. 4 implements an Omega network structure in accordance with one embodiment of the present invention. In particular, a set of 80 binary switching elements is divided into 5 columns and 16 rows in a cascading manner, where each column has 16 binary switching elements, and each binary switching elements has two input bits and two output bits. The Omega network as shown in FIG. 4 has two output bits from each of said 16 binary switching elements in one column being received as input bits by different binary switching elements in a subsequent column. Various implementations of the Omega network may occur but the behavior of the five stage Omega network for N=32 is represented by the Omega network as shown in FIG. 4. The Beta value for the switch element can be supplied in part by the cryptographic keying variable.

Figure 5:
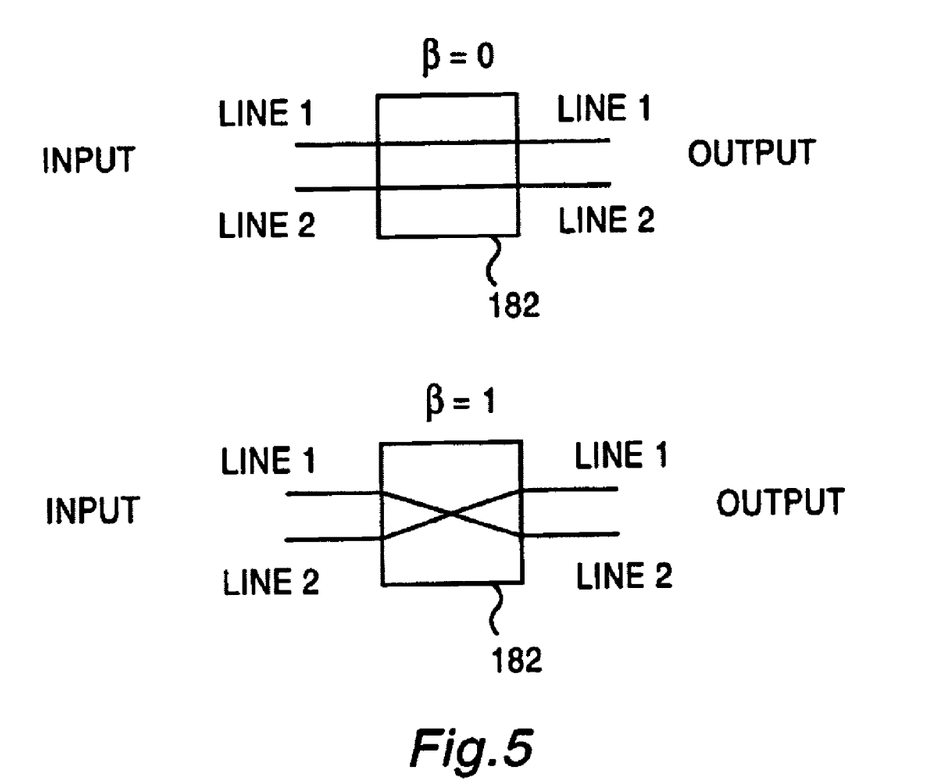
FIG. 5 is a block diagram illustrating the behavior of the single bit Beta element switching function according to the present invention.

FIG. 5 shows the Beta dependent switching function of each switch element 182. In this example when the Beta element is set to zero it passes the signal on input line 1 to output line 1 and the signal on input line 2 to output line 2. When the Beta element is set to one it passes the signal on input line 1 to output line 2 and the signal on input line 2 to output line 1. The effect of the total Omega network is the mechanism that implements a permutation of the 32 bit input vector 148 resulting in the 32 bit output vector 174.

FIG. 6 illustrates the Omega Network as shown in FIG. 5 combined with the related fixed permutation 184 of 32 elements. That is, by cascading the Omega network with the appropriate P' permutation 184, the combination of the DPP followed by P' yields a permutation that corresponds to the original P function in the traditional DES. The permutation mapping of the P' function which is defined in Table 1 is the fixed permutation which when applied after a P* produced by the Omega network with Beta elements set to the default condition zero yields the P permutation of the traditional DES.

TABLE 1

| | Bit Position | | | | | | | |
| --- | --- | --- | --- | --- | --- | --- | --- | --- |
| From | 1 | 2 | 3 | 4 | 5 | 6 | 7 | 8 |
| To | 16 | 7 | 20 | 21 | 29 | 12 | 28 | 17 |
| From | 9 | 10 | 11 | 12 | 13 | 14 | 15 | 16 |
| To | 1 | 15 | 23 | 26 | 5 | 18 | 31 | 10 |
| From | 17 | 18 | 19 | 20 | 21 | 22 | 23 | 24 |
| To | 2 | 8 | 24 | 14 | 32 | 27 | 3 | 9 |
| From | 25 | 26 | 27 | 28 | 28 | 30 | 31 | 32 |
| To | 19 | 13 | 30 | 6 | 22 | 11 | 4 | 25 |

The Omega network cascaded with the fixed permutation as shown in FIG. 6 can be realized with an inexpensive and electronically fast circuitry and the associated software, such as FPGAs.

The preferred embodiment described herein utilizes a Field Programable Gate Array (FPGA) 136 which is a device performing the function of a custom electronic digital logic circuit but is user-programmable and even reprogrammable in the system. The device typically has the capability to implement combinatorial logic in small look-up tables such that each table either feeds the input of a flip-flop or drives other logic or connects to input or output blocks. There are many configurations of FPGAs and various devices are designed for special properties such as high speed or low power. Advantages of FPGAs are much faster time from design to implementation and much cheaper implementation costs for smaller numbers of systems. If very large volumes of a device are to be produced then it may be cheaper to implement the logic in a custom large scale integrated digital circuit.

For each round of the encryption process, the permutation in each f function can be varied, and the variation need not by cyclic after sixteen rounds but non-repeating throughout an encryption. Additionally, the variation in the permutation can also be a function of the extended keying variable.

The interconnection of beta switch elements as shown in FIGS. 4 and 6 is arranged so as to perform a perfect riffle shuffle permutation (See for example "Access and Alignment of Data in an Array Processor," D. Lawrie, IEEE Transactions on Computers, Vo. 24, pp. 1145–1155). That is, the ordering of the inputs as shown in FIG. 4 is a perfect riffle shuffle permutation (i.e., the inputs are in order 1, 17, 2, 18, 3, 19 . . . , 16, 32). This is a very powerful permutation network that is capable of executing on the order of the square root of all possible permutations of 32 distinct elements which is 32! or $10^{35.4}$ and whose set of executable permutations includes some very important subclasses including the identity permutation.

Since the Omega network as shown in FIG. 6 requires 80 one bit controls, some of these controls can be set by utilizing bits from the cryptographic key that are not used in the calculation of the key schedule, i.e. that are not used in 138. These control bits from the keying variable would then be invariant over the life of that particular keying variable. The remaining controls would be fixed or be a function of the round of the ECB mode and a function of the round number plus. In the k-bit cipher feedback mode, the encipherment cycle number would be zero for the production of the first k-bits, one for the production of the second k-bits, and so on. Thus the round number plus 16 times the encipherment cycle number would be 1, 2, 3, . . . , 16, 17, 18, . . . , 31, 32, respectively, for the 32 rounds involved in the production of the first two k-bit blocks. It may also be that the bits for the Beta elements be a function not only of the round number plus 16 times the encipherment cycle number, but also the Initialization Vector (IV) which in the Output Feedback mode would be 110.

The number of bits from the cryptographic keying variable, and the number of bits from the sources described above, would need to sum to 80 as this is the number of one-bit controls needed to set the 5 level 32 input omega network. A standard key length is 128 bits, so in the present invention a preferred embodiment would use 56 bits for the traditional DES key schedule and the remaining 72 bits as control bits for 72 Beta elements. The additional 8 bits needed to completely define the 80 element omega network in this example could be fixed for a particular implementation or use or could be variable within a cryptoperiod or from cryptoperiod to cryptoperiod.

Additionally, a network referred to as the Benes-Waksman network, which is realizable with Beta elements for all of the 32! permutations, can also be used in the present invention as an alternative arrangement for the permutation network. The Benes-Waksman network differs from the Omega network in the sense that every stage is not identical in its connection to every other stage. However, it is also understandably more complex than the omega network considered above.

It is anticipated that for whatever scheme is selected that the means to implement a scheme will be using the control means 200 and input means 204 and storage means 206 with an output means 202 for testing and verification of schemes. These are shown in FIG. 7.

Figure 7:
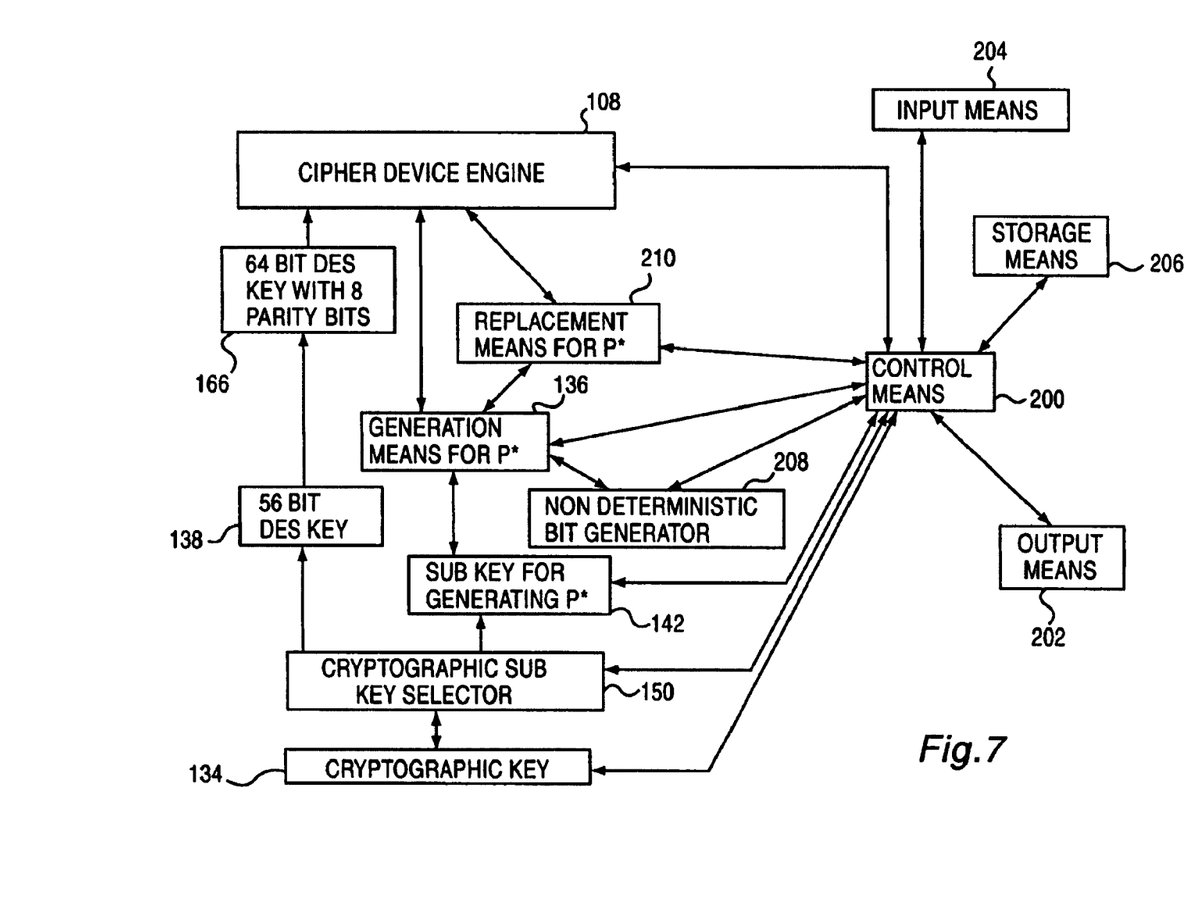
FIG. 7 is a diagram illustrating relationship of major elements in the present invention.

FIG. 7 shows the major elements of the present invention. It should be noted in the preferred embodiment applicants have combined the P* generation and replacement process 136 by using an Omega switching network. In a more general setting it is possible to separate the P* generation process from the P* replacement 210. For example one or more of the P* permutations known only to authorized parties could be loaded into various of the cryptographic devices via input port 204 and under control of a control module 200 stored in a storage device for use as required in the encryption engine 108. Of course, in this case the implementation of the encryption engine would need to allow for a P* that can be changed such as in a look up table. An output means 202 is included which can be used during testing to examine various states and registers of the system or to output completed or partial results of the cryptographic process.

Referring primarily to FIG. 7, it is desirable in some circumstances to have a single cipher device for a plurality of users. Also it can be desirable for a cipher device to have the feature of encrypting/decrypting a portion of a single user's traffic and then later continuing encrypting/decrypting other portions of the same user's traffic with the same cipher key but different cipher engine synchronization data such as in a packet switched network (e.g. the internet).

The present invention anticipates the efficient implementation of these features by the presence of a control means 200 and a storage means 206 and an input means 204 with the control means 200 connected to elements of the cipher system encryption engine 108 the replacement means for P* 210 the generation means for P* 136 the subkey register 142 and the cipher or cryptographic key 134. One example of this scheme in operation for a single user has the input means 204 sending a signal to control means 200 that the current operations should be suspended but not terminated after the encryption or decryption of so many bits of traffic. At the completion of the current operation on the said amount of traffic the control means 200 stops the current cipher operation and determines the contents of registers and internal states of the cryptographic key 134 and the 64 bit DES key 166 and the cipher device encryption engine 108 and replacement means for P* 210 and generation means for P* 136 and sub key for generating P* 142. All information necessary to restore the cipher system to its current state and to sequentially continue operations at some later time is then stored with an identification of the user in the storage means 206 for later retrieval and continuation of the cipher operations.

A similar process to that described above can be used to suspend cipher operations for one user's traffic and start or continue with cipher operations for another user. In this way a single or small number of cipher devices can service a much larger population of users in an efficient manner by quickly determining and storing the cipher system states for one user and rapidly extracting from the storage means 206 and loading the appropriate data into the system elements so as to allow the cipher system to sequentially restart and continue operations with another user.

Similarly, a single cipher device with the above described store and restore features could service a single user who has requirements for a plurality of different but simultaneous cipher operations or for a single user to simultaneously communicate with different cipher keys with a plurality of other users.

Additionally, a network referred to as the Benes-Waksman network, which is realizable with Beta elements for all of the 32! permutations, can also be used in the present invention as an alternative arrangement for the permutation network. The Benes-Waksman network differs from the Omega network in the sense that every stage is not identical in its connection to every other stage. However, it is also understandably more complex than the omega network considered above.

Although a specific form of the present invention has been described above and illustrated in the accompanying drawings in order to be more clearly understood, the above description is made by way of example and not as a limitation to the scope of the present invention. It is believed that various modifications apparent to one of ordinary skill in the art could be made without departing from the scope of the present invention which is to be determined by the following claims.

What is claimed is:

1. In a device for performing the Data Encryption Standard (DES) on a block of data bits under control of a DES key and a second cipher key, in combination with a modified "P" permutation in the "f" function, wherein said modified "P" permutation is selected by a control signal and said control signal utilizes at least some function of a subset of said DES key and said second cipher key.

2. The improved device of claim 1, wherein said second cipher key specifies said modified "P" permutation.

3. The improved device of claim 1 including logic gates for implementing said modified "P" permutation.

4. The improved cryptographic device of claim 1 wherein said control signal can be set so that the improved cryptographic device performs the DES.

5. The improved device of claim 1 wherein said function is time invariant.

6. The improved device of claim 1 wherein said function is time varying.

7. The improved cryptographic device of claim 3 wherein said logic gates comprise an Omega network.

8. The improved cryptographic device of claim 3 wherein said logic gates comprise a Benes-Waksman network.

9. The improved cryptographic device of claim 1 with a suspension control means to suspend operation of said improved cryptographic device and a cryptographic parameter storage means.

10. The improved cryptographic device of claim 1 including derivation means to derive said DES key and a said second cipher key from a third cipher key.

11. In a device for performing the "f" function of the Data Encryption Standard (DES), the combination with a modified permutation means to produce a modified permutation replacing the fixed permutation "P" of the DES, said modified permutation means being dependent upon a control means, which utilizes at least some function of a subset of a DES key and a second cipher key.

12. The improved device of claim 11 with said modified permutation means which produces a permutation equal to said fixed permutation "P".

13. A method for performing the Data Encryption Standard (DES) on a block of data bits under control of a DES key and a second cipher key, in combination with a modified "P" permutation in the "f" function, comprising the step of:

replacing the "P" permutation in the "f" function by said modified permutation, wherein said modified permutation is at least a function of a subset of said DES key and said second cipher key.

14. The method of claim 13 wherein the modified permutation is dependent upon a second cipher key.

15. The improved cryptographic method of claim 13 wherein said modified permutation can be selected so that said improved cryptographic method performs the DES.

16. The improved cryptographic method of claim 13 wherein operation of the improved method may be suspended and resumed according to a control means and comprising the steps of:

suspending operation of the improved cryptographic method by a control means;

storing in a storage means the cryptographic parameters and data so cipher operations can be resumed at the point of said suspended operation;

retrieving said cryptographic parameters and data upon signal from said control means;

entering said retrieved cryptographic parameters and data into appropriate cipher operation locations; and resuming operation of said improved cryptographic method at said point of said suspended operation upon signal from said control means.

17. In a device for performing the encrypt process or the decrypt process of the Data Encryption Standard (DES) on a block of data bits under control of a DES key in combination with a modified "P" permutation in the "f" function, wherein said modified "P" permutation is selected by a control signal and said control signal utilizes at least a function of a subset of a DES key and a second cipher key in combination with a non deterministic bit generator so that the said device output is non deterministic.

* * * * *